United States Patent [19]
Polasky et al.

[11] Patent Number: 5,225,078
[45] Date of Patent: Jul. 6, 1993

[54] POUR-THROUGH PITCHER FILTER

[75] Inventors: Ralph A. Polasky, Ripon; Vue X. Yang, Sheboygan, both of Wis.

[73] Assignee: Ametek, Inc. Plymouth Products Division, Sheboygan, Wis.

[21] Appl. No.: 845,690

[22] Filed: Mar. 4, 1992

[51] Int. Cl.⁵ .............................................. B01D 27/02
[52] U.S. Cl. ..................... 210/264; 210/265; 210/282; 210/418; 210/477; 210/482
[58] Field of Search ............... 210/263, 264, 265, 282, 210/418, 473, 475, 476, 477, 482, 497.01, 497.2

[56] References Cited

U.S. PATENT DOCUMENTS

| | | | |
|---|---|---|---|
| 3,038,610 | 6/1962 | Hetherington | 210/282 |
| 3,715,035 | 2/1973 | Teeple, Jr. et al. | 210/265 |
| 4,306,971 | 12/1981 | Hankammer . | |
| 4,529,511 | 7/1985 | Breeden et al. | 210/282 |
| 4,776,956 | 10/1988 | Gannaway | 210/282 |
| 4,895,648 | 1/1990 | Hankammer . | |
| 4,969,996 | 11/1990 | Hankammer . | |
| 4,998,228 | 3/1991 | Eger et al. | 368/93 |
| 5,019,252 | 5/1991 | Kamei et al. | 210/282 |
| 5,076,922 | 12/1991 | DeAre | 210/282 |
| 5,106,501 | 4/1992 | Yang et al. | 210/266 |
| 5,120,437 | 6/1992 | Williams | 210/282 |

Primary Examiner—Robert A. Dawson
Assistant Examiner—W. L. Millard
Attorney, Agent, or Firm—Andrus, Sceales, Starke & Sawall

[57] ABSTRACT

A pour-through pitcher filter assembly includes a compact filter element including a thin annular disk of molded activated carbon and a peripheral annular seal element. The seal element allows the filter to be replaceably mounted in the lower end of a plastic reservoir, which reservoir is adapted to be supported in the top of a pitcher for receiving filtered water. The reservoir may be made by a blow molding process and includes an integral bellows member which is manually collapsible to pressurize the interior of the reservoir to initiate gravity flow through an initially dry filter element. The seal element utilizes a synthetic rubber material and is preferably insert molded around the carbon filter disk.

21 Claims, 2 Drawing Sheets

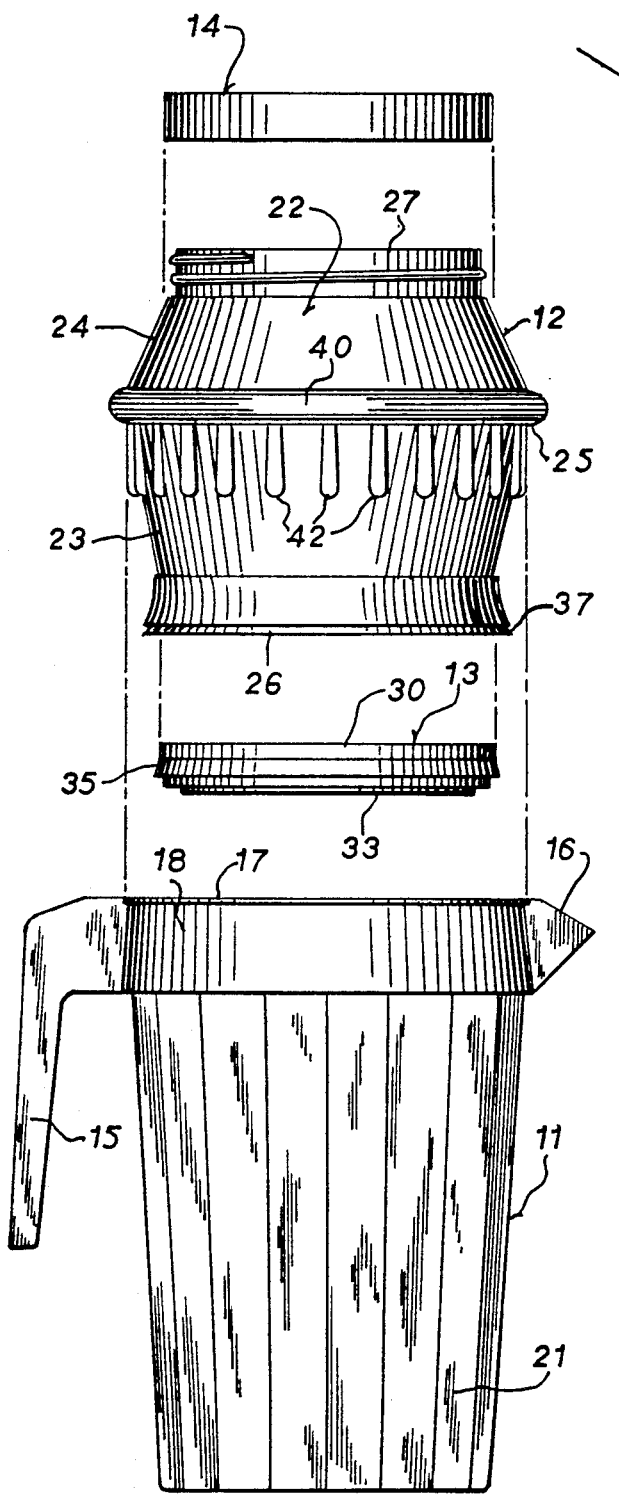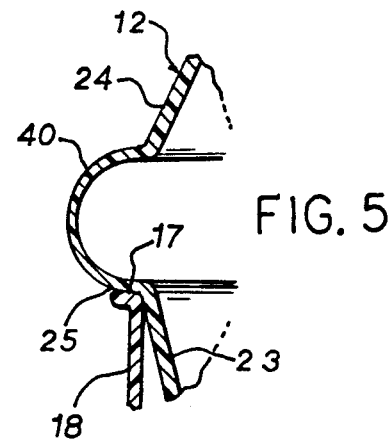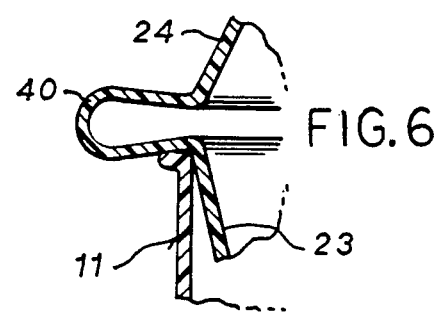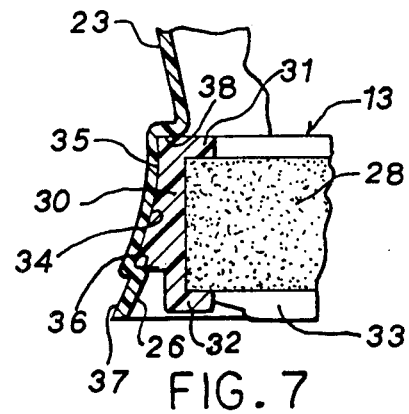

POUR-THROUGH PITCHER FILTER

BACKGROUND OF THE INVENTION

The present invention relates to a filter assembly for removing impurities from a liquid and, more particularly, to an activated carbon drinking water filter of the type especially adapted to be used in conjunction with a pitcher for receiving and dispensing the filtered water.

It is known in the prior art to utilize small activated carbon filters to treat drinking water in order to improve or eliminate undesirable taste and/or odor caused by dissolved minerals, organic chemicals and the like. Such filter will also remove sediment and colloidal particles. It is also known to provide such filters with an upper reservoir for water to be treated such that the reservoir and filter can be placed on a pitcher for receiving and dispensing the filtered water. Such assemblies are sometimes referred to as pour-through pitcher filters because they rely on gravity flow of the water from the reservoir to the pitcher via the filter. As presently known to applicants, the pour-through carbon filter elements currently available all utilize granular activated carbon as the filter media. The granular carbon is packed into and retained in an appropriate enclosure, typically including upper and lower screens having a mesh size sufficiently small to retain the granular filter material therein. The cartridge or canister of granular activated carbon may be separately removable from the reservoir for replacement or may be formed as an integral part of the reservoir so that the combination of the reservoir and filter cartridge are replaced together.

Typically, the filter cartridge containing granular activated carbon occupies a relatively large volume in order to provide adequate efficiency in the removal of contaminants and to provide an adequate filtering life before replacement is necessary. The relatively large volume of granular carbon which is required results in a typically bulky construction in prior art pour-through filters. As a result, the size of the pitcher typically used with the filter may have to be increased, reduction in the usable volume of the pitcher may have to be accepted, or a larger reservoir/filter element combination resting atop the pitcher may have to be tolerated. In addition, granular carbon filter cartridges are known to be subject to channeling in use, resulting in inadequate residence time and loss of filtering capability. Also, with a loose granular filter material, it is possible to disrupt the upper portion of the bed when water is poured into the reservoir.

Prior art pour-through pitcher filters are shown, for example, in U.S. Pat. Nos. 4,306,971; 4,895,648 and 4,969,996. Each of the filters disclosed in the foregoing patents utilizes a filter element comprising a particulate filter media such as granular activated carbon. As a result, each of the disclosed prior art constructions possesses one or more of the disadvantages mentioned above.

SUMMARY OF THE INVENTION

The pour-through pitcher filter assembly of the present invention utilizes a filter element made from a rigid sintered block of activated carbon. The sintered carbon block filter element is substantially smaller in volume than the corresponding granular filter elements of the prior art, allowing a pitcher filter assembly to be utilized which is smaller, lower in profile, and more compact than prior art devices.

In accordance with a preferred embodiment of the invention, a pour-through pitcher filter assembly, intended primarily for domestic use in filtering drinking water, utilizes a conventional water pitcher which includes an open upper end defined by a peripheral rim and a pour lip for dispensing filtered water. A reservoir for holding a supply of water to be filtered is inserted partially into the pitcher and includes a medial peripheral edge to demountably support the reservoir on the rim of the pitcher. The lower end of the reservoir extends downwardly into the pitcher and terminates in a drain opening within which a rigid porous activated carbon filter element is mounted. The interface between the filter element and the drain opening in the reservoir is sealed with a water tight edge seal. The upper end of the reservoir extends above the supporting rim and terminates in an upper fill opening.

The edge seal preferably comprises a rubber seal element which is molded around the outer edge of the filter element and demountably secures the element in the drain opening for easy replacement. Further, the drain opening preferably includes a peripheral lip which defines an annular recess into which the rubber seal element may be inserted with a press fit to secure the same in place.

A closure means, such as a conventional lid, is used to cover the fill opening in the upper end of the reservoir and means are provided for pressurizing the interior of the closed reservoir to initiate the flow of water through the dry filter element, which initial flow may be inhibited because of surface tension. Preferably, the means for pressurizing the interior of the reservoir comprises a collapsible bellows member which is formed integrally into the outer wall of the reservoir. In the preferred embodiment, the bellows member is formed integrally with the medial peripheral edge of the reservoir which supports the reservoir in the pitcher. The medial peripheral edge of the reservoir also preferably includes a series of vertically disposed, circumferentially spaced projections which extend downwardly and engage the interior of the pitcher to center the reservoir and space it from the pitcher wall to facilitate dispensing the filtered water without removing the reservoir.

BRIEF DESCRIPTION OF THE DRAWINGS

FIG. 2 is an exploded side elevation view of the components of the filter assembly shown in FIG. 1.

FIG. 5 is a sectional detail of the pressurizing bellows member in its relaxed state.

FIG. 6 is a sectional detail similar to FIG. 5 showing the bellows member in its collapsed state.

FIG. 7 is an enlarged sectional detail showing the mounting of the filter element in the filter reservoir.

DETAILED DESCRIPTION OF THE PREFERRED EMBODIMENTS

Figure 1:
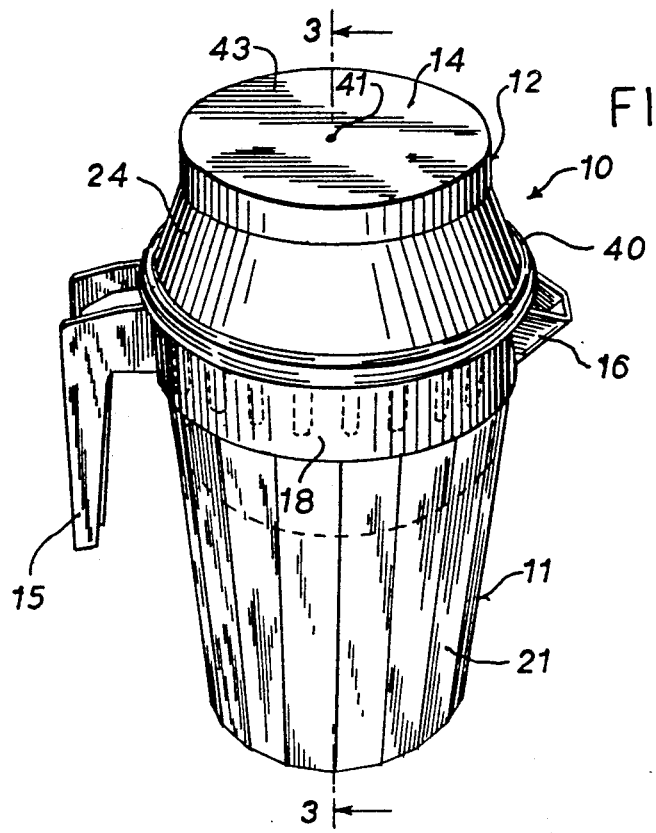
FIG. 1 is a perspective view of the pour-through pitcher filter assembly of the present invention.
Figure 4:
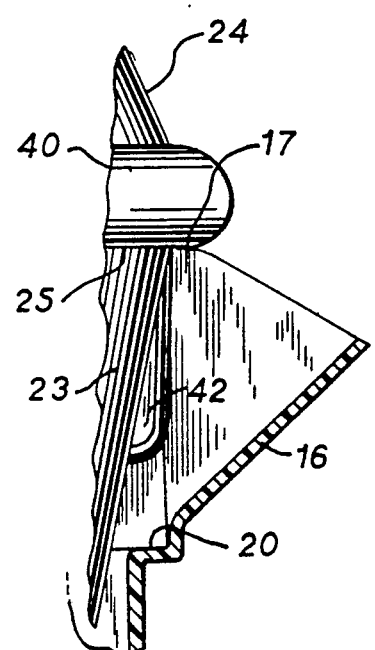
FIG. 4 is an enlarged vertical sectional detail rotationally offset from the plane of FIG. 3.
Figure 3:
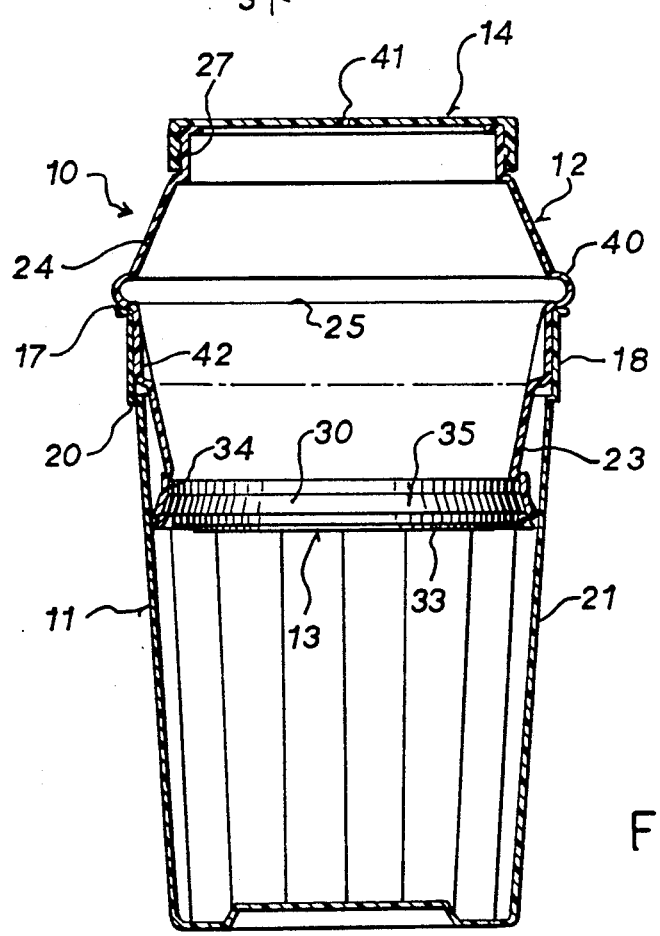
FIG. 3 is a vertical section taken on line 3—3 of FIG. 1.

Referring initially to FIGS. 1—3, the pour-through pitcher filter assembly 10 of the present invention includes four parts, namely, a pitcher 11 for receiving and dispensing filtered water, a reservoir 12 for holding the water to filtered, a filter element 13 positioned in the lower end of the reservoir 12, and a lid or cover 14 for closing the upper end of the reservoir. The pitcher 11 is preferably injected molded from a suitable plastic, such as polypropylene, and includes an integral handle 15 and a pour spout 16 positioned on diametrically opposite sides of an upper rim 17 defining the open upper end of the pitcher. The upper portion of the pitcher extending a short distance downwardly from the rim 17 includes a generally cylindrical portion 18 which is separated by an annular shoulder 20 from the main lower base portion 21 which is of generally frustoconical shape.

The reservoir 12 is also preferably made of a suitable plastic, such as polypropylene, and may most conveniently be manufactured by a blow molding process. As may best be seen in FIGS. 2 and 3, the unitary outer wall 22 of the reservoir 12 includes a lower end 23 and an upper end 24 of oppositely extending frustoconical shapes which are integrally joined by a medial peripheral edge 25 which supports the reservoir on the rim 17 of the pitcher. The lower end 23 of the reservoir terminates in an annular drain opening 26 and the upper end 24 of the reservoir terminates in an annular fill opening 27. The filter element 13 is demountably secured in the drain opening 26 and the cover 24 is removably attached to the fill opening 27 in a conventional manner.

Referring also to FIG. 7, the filter element 13 comprises a rigid porous carbon block 28 in the shape of a thin annular disk. The carbon block 28 may be made in a conventional manner wherein granular activated carbon and a suitable binder, such as polyethylene are compressed and heated to form a molded porous block. In the presently preferred embodiment, a carbon block 28 having a nominal 20 micron porosity is approximately ½ inch (13mm) thick and 4¼ inches (5.5 cm) in diameter.

An annular synthetic rubber seal 30 is attached to the outer periphery of the carbon block 28. The rubber seal may comprise a neoprene-like material, and one particularly suitable seal material is that sold under the trademark KRATON. The seal 30 is preferably formed by injection molding around the carbon block 28, the latter being positioned as a core element in an insert molding die. As may best be seen in FIG. 7, the seal 30 is formed with upper and lower annular lips 31 and 32, respectively. The lips 31 and 32 help hold the seal element 30 in position around the edge of the carbon block 28 and provide additional sealing to prevent the bypass of unfiltered water between the seal-filter element interface. The seal 30 may also be formed with a pair of cross elements 33, a portion of one of which is shown in FIG. 7. The cross elements 33 extend diametrically across the lower face of the carbon block filter 28 and at right angles to one another. The cross elements may serve as runners in the injection molding process and additionally provide supplemental bearing support for installation of the filter element 13 into the reservoir 12, as will be described hereinafter.

The outer wall of the reservoir 12, immediately above the drain opening 26 is provided with an annular recess 34. The recess 34 is slightly tapered to flare outwardly in the direction of the drain opening 26 and includes a lower shoulder 36 defining an integral connection to a flared lower skirt portion 37 at the drain opening. The annular recess 34 terminates upwardly in an upper shoulder 38 which defines an integral connection to the frustoconical lower end 23 of the reservoir 12.

The sealing face 35 of the seal 30 is shaped and dimensioned to fit tightly in the annular recess 34 with a fairly tight compression fit as the filter element is pressed axially upwardly into the drain opening 26. To install the filter element 13 in the reservoir 12, the filter element is preferably laid on a flat supporting surface and supported by the cross elements 33 which extend slightly below the lower annular lip 32 of the seal 30. By applying manual pressure to the cover 14 attached to the reservoir 12, the filter element is forced through the drain opening and the seal 30 into the annular recess 34. The cross elements 33 are of sufficient thickness in the axial direction of the reservoir so that the annular upper lip 31 of the seal bottoms on the upper shoulder 38 of the annular recess before the lower skirt portion 37 of the reservoir bottoms on the supporting surface. The resulting tight compression fit of the annular seal 30 in the recess 34 provides a water-tight seal.

Referring also to FIGS. 5 and 6, the medial peripheral edge 25 of the reservoir 12 is defined by a toroidal shaped bellows element 40. When the filter element is used initially or after it has remained unused for a length of time, surface tension between water in the reservoir which is to be filtered and the dry porous carbon block 28 may inhibit normal gravity flow of the water through the filter element. To initiate flow, manual pressure is applied to the cover 14 in a vertical downward direction causing the bellows element 40 to collapse, as shown in FIG. 6. Collapse of the bellows element results in compression of the air in the reservoir above the level of the water and the increased air pressure forces the water through the dried carbon block element 28 to initiate flow. Once flow has started, it will continue by gravity so long as the filter element is maintained moist. The cover 14 is provided with a pressure equalizing hole 41 which must be covered by the hand of the user when the bellows element 40 is collapsed to pressurize the reservoir.

Extending downwardly from the medial peripheral edge 25, below the bellows element 40 is a series of vertically disposed, circumferentially spaced projections 42 formed in the upper portion of the lower end 23 of the reservoir. The outer surfaces of the projections 42 define a generally cylindrical surface which corresponds to the cylindrical portion 18 at the top of the pitcher 11. The projections 42 provide a snug fit of the reservoir 12 in the pitcher and the spaces between adjacent projections 42 enhance the size of the flow opening adjacent the pour spout 16 to facilitate pouring the filtered water from the pitcher.

The combination of the reservoir 12 and filter element 13 has separate utility independently of the pitcher 11. The reservoir and filter element provide a compact and easy to use assembly for filtering drinking water into any type of container positioned below the drain opening 26. However, rigid support for the reservoir 12, as by mounting it in the pitcher, is preferred if compression of the bellows element 40 is needed to initiate flow.

As indicated, the filter element 13 is intended to be replaceable. In the size of the carbon block 28 described above, it is anticipated that the filter will accommodate up to 100 gallons (about 380 liters) of water before requiring replacement. In lieu of the seal 30 injection molded directly onto the carbon block 28, a separate annular seal may be provided between the carbon block 28 and a suitable annular recess, such as the recess 34 in the lower end of the reservoir. For example, annular O-ring seals or annular seals of other cross sectional shapes might be placed in the annular recess and the carbon block 28 pressed thereinto. However, because of anticipated greater difficulty in assembly and lower reliability in sealing, the molded flexible rubber seal 30 is preferred. In another alternate construction, the lower end of the reservoir defining the drain opening could be molded directly to and around the edge of the carbon block. An adequate seal can be attained with such construction, but replacement of the filter would require replacement of the reservoir as well. The seal in such an integrally molded construction could be enhanced by providing the sintered carbon block with an excess of polyethylene or other resin binder material, particularly around the outer peripheral face, to soften or melt and seal with the polypropylene material from which the reservoir is molded.

It is also possible to utilize other means for pressurizing the interior of the reservoir 12 to initiate the flow of water through a dry filter element 13. Instead of the bellows element 40, the cover 14 could be provided with a flexible center portion 43 or a similar bellows element could be incorporated into the edge of the cover itself. The reservoir could, of course, also be pressurized by an external source of air pressure in communication with the reservoir as, for example, through the hole 41 in the cover.

Various modes of carrying out the present invention are contemplated as being within the scope of the following claims particularly pointing out and distinctly claiming the subject matter which is regarded as the invention.

We claim:

1. A pour-through gravity flow filter assembly for a liquid comprising:
    a reservoier for holding a supplying of the liquid to be filtered, said reservoir including an outer wall defining a generally open interior;
    a fill opening in the upper end of the reservoir and a drain opening in the lower end of the reservoir;
    a rigid filter element mounted across said lower drain opening;
    seal means for providing a liquid-tight seal between the outer peripheral edge of the filter element and the drain opening;
    closure means for closing the fill opening to selectively close the reservoir, said closure means including manually sealable vent means normally opening the reservoir to atmosphere when the fill opening is closed; and,
    means for simultaneously closing said vent means and for manually pressurizing the interior of the closed reservoir to effect a temporary decrease in the volume thereof sufficient to initiate liquid flow through the filter element.

2. The assembly as set forth in claim 1 wherein said filter element comprises a sintered block of granular carbon.

3. The assembly as set forth in claim 1 wherein said seal means comprises a flexible rubber seal attached to the filter element and adapted to be demountably inserted into the drain opening.

4. The assembly as set forth in claim 1 wherein said closure means comprises a removable lid, said lid being demountably attachable to the reservoir and including a small air inlet opening.

5. The assembly as set forth in claim 1 wherein said pressurizing means comprises means for manually reducing the volume of the open interior of the reservoir.

6. The assembly as set forth in claim 5 wherein said means for reducing the volume of the reservoir comprises a collapsible bellows member in the outer wall.

7. The assembly as set forth in claim 5 wherein said means for reducing the volume of the reservoir comprises providing said removable lid with a manually deflectable membrane.

8. A gravity flow filter assembly for water comprising:
    a reservoir for a supply of water to be filtered, said reservoir having a generally open interior enclosed by an outer wall;
    fill means in the upper portion of the reservoir for supplying water to the reservoir;
    drain means in the lower portion of the reservoir for discharging water from the reservoir;
    a molded carbon block filter element mounted in the reservoir and forming the drain means;
    means for closing the fill means to selectively seal the reservoir; and
    means for pressurizing the interior of the sealed reservoir to initiate the flow of water in the reservoir through the filter element.

9. The assembly as set forth in claim 8 wherein said drain means comprises:
    a drain opening defined by the lower end of the outer wall of the reservoir; and,
    a flexible rubber seal positioned between the filter element and the drain opening.

10. The assembly as set forth in claim 9 wherein the rubber seal is attached to the filter element.

11. The assembly as set forth in claim 10 wherein the rubber seal is molded around the outer peripheral edge of the filter element.

12. The assembly as set forth in claim 8 including:
    a pitcher for receiving filtered water from the reservoir; and,
    means for demountably attached the reservoir to the pitcher.

13. The assembly as set forth in claim 8 wherein said filter element comprises a thin circular disk.

14. A pour-through pitcher filter assembly for filtering drinking water, said assembly comprising:
    a pitcher for receiving and dispensing filtered water having an open upper end defined by a peripheral rim, said rim including a pour lip;
    a reservoir for a supply of water to be filtered, said reservoir having a generally vertically extending outer wall defining a medial peripheral edge demountably supporting the reservoir on the rim of the pitcher with a lower reservoir end extending downwardly into the pitcher and an upper reservoir end extending above the peripheral rim, said lower reservoir end terminating in a drain opening and said upper reservoir end terminating in a fill opening;
    a rigid porous carbon filter element mounted in the reservoir drain opening; and,
    a peripheral rubber edge seal molded around the outer edge of the filter element and defining the interface between the element and the drain opening.

15. The assembly as set forth in claim 14 wherein said filter element is demountably secured in the drain opening.

16. The assembly as set forth in claim 15 wherein the drain opening comprises a peripheral lip on the lower end of the wall of the reservoir, said peripheral lip defining an annular recess for receipt of the rubber seal element.

17. The assembly as set forth in claim 16 wherein seal element is received in said annular recess with a press fit.

18. The assembly as set forth in claim 14 including:

closure means for covering the fill opening and for closing the reservoir; and, means for pressurizing the interior of the closed reservoir to initiate the flow of water through the filter element.

19. The assembly as set forth in claim 18 wherein said pressurizing means comprises a vertically collapsible bellows member in the outer wall of the reservoir.

20. The assembly as set forth in claim 19 wherein said bellows member is formed integrally with the medical peripheral edge of the reservoir.

21. The assembly as set forth in claim 14 including a series of vertically disposed, circumferentially spaced projections on the outer wall of the reservoir, said projections extending downwardly from the medial peripheral edge and adapted to engage the interior of the pitcher adjacent the peripheral rim.

* * * * *